July 14, 1959     J. A. GAYLORD     2,894,532
VACUUM PACK AND CONTROL UNIT
Filed Sept. 28, 1953
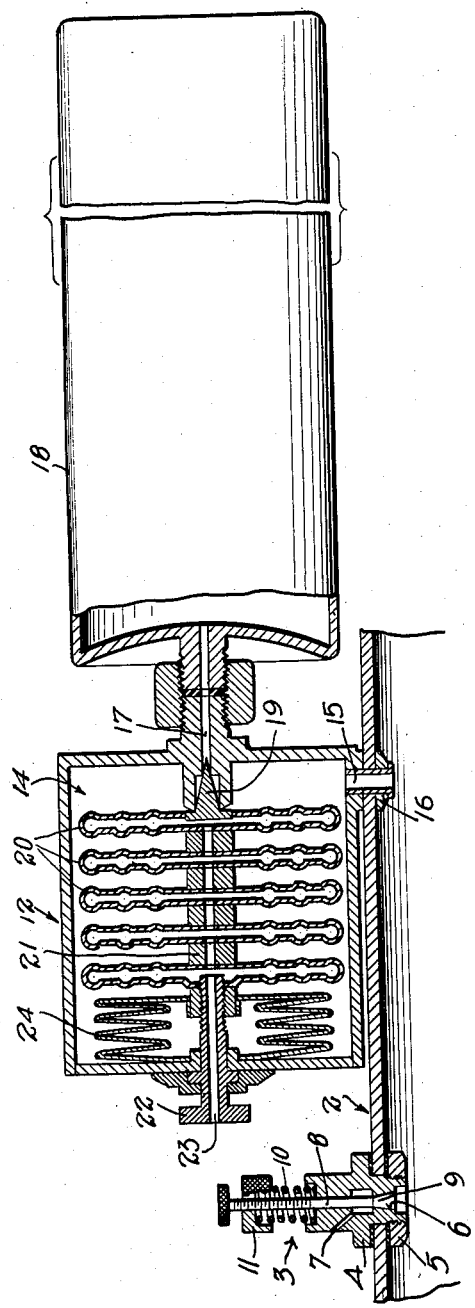
INVENTOR.
JOHN A. GAYLORD
BY
ATTORNEYS

United States Patent Office 2,894,532
Patented July 14, 1959

2,894,532

VACUUM PACK AND CONTROL UNIT

John A. Gaylord, Pacific Palisades, Calif., assignor of one-half to Rocket Jet Engineering Corp., Glendale, Calif., a corporation of California Application September 28, 1953, Serial No. 382,633

4 Claims. (Cl. 137—505)

This invention relates to a vacuum pack and control unit designed to maintain and regulate the differential of pressure inside a vacuum pack container and the atmosphere. In the operation of aircraft it is desirable to have apparatus operated to maintain the vacuum within a vacuum pack container at a reasonably constant differential with respect to the surrounding air pressure. Thus, for example, for the purpose of packing a parachute under vacuum it is desired to have means for maintaining a successive constant differential of air pressure within the vacuum pack container and the surrounding atmosphere. At ground level the differential in pressure within the vacuum pack container and the atmosphere influence the release of a parachute as it is withdrawn from the container. In the flight of aircraft the surrounding atmospheric pressure undergoes wide variations. A wide variation will occur between the pressure differential within the vacuum pack container and the atmosphere, and thus means are provided to compensate for this.

It is a general object of the present invention to provide means which will increase the vacuum within a vacuum pack container as the surrounding atmospheric pressure decreases in order to maintain the differential between the atmospheric pressure and that within the container within desired limits. This necessitates a means for increasing the vacuum within the container as the airplane rises in height.

Another object of the present invention is to provide means for decreasing the vacuum within the vacuum pack container as the aircraft descends or the atmospheric pressure increases, and also to maintain the differential of pressure within the desired limits.

The foregoing objects of the present invention are carried out by an apparatus, the preferred form of which is illustrated in the accompanying drawings in which the figure is an elevation partially in vertical section.

Referring to the drawings, 2 generally indicates the wall of a vacuum pack container. The vacuum pack container is broken away but it is to be understood that the wall 2 is indicated as representing any vacuum container unit the vacuum of which is to be controlled and in which there is some object to be packed, and possibly to be removed therefrom, during flight of the aircraft.

The apparatus also comprises an air relief valve 3 designed to automatically permit the inlet of air into the vacuum pack container, the wall of which is represented at 2, whenever the vacuum within said container is at an excess differential with respect to the surrounding atmosphere. For this purpose a relief valve is indicated as comprising a body 4 having a threaded stem passing through an opening of the wall and there held in position by a nut 5. Suitable packing material may be used where needed but in the example illustrated the wall 2 of the vacuum pack container may be a plastic material susceptible of forming an airtight connection without the necessity of any further packing material. The body 4 of the relief member is provided with an axial bore having a tapered seat 6. Beyond the tapered seat there is an air vent 7. The valve also includes a movable valve member 8 having a tapered portion 9 for engaging said seat in the closed position. Said valve is yieldingly urged to the closed position by the spring 10 engaging the threaded adjustment nut 11.

In operation whenever the differential pressure on the exterior of the container wall 2 and the interior of the container wall exceeds a predetermined value as set by the adjustment of nut 11 on spring 10 then the vacuum within the container 2 opens the valve 8 and atmospheric air enters the container 2 to suitably reduce the differential in pressure. There is thus provided means for introducing atmospheric air into the vacuum pack container when the vacuum in the container is too high in comparison with pressure of the surrounding air.

The apparatus also includes means designed to increase the vacuum within the container 2 as the atmospheric pressure decreases in order to maintain a desired differential and for this purpose there is indicated a control unit having a casing 12, the inner chamber 14 of which communicates with the interior of the container 2 through the opening 15 in the gusset 16. The chamber 14 is thus maintained under the same vacuum as that retained within the container 2. The chamber 14 also communicates through a valve passage 17 with a vacuum tank 18. There is also provided a needle valve 19 which normally closes the passage 17 connecting the chamber 14 and the vacuum tank 18. The diameter of the passage normally closed by the needle valve should be relatively small for proper control, such for example, as the order of about 0.01 inch.

The movement of the needle valve member 19 is under control of the plurality of closed diaphragm members 20, the interior of which is maintained under atmospheric pressure while the exterior is exposed to the vacuum within chamber 14, which is the same as that within the container 2. As illustrated the diaphragm members 20 are mounted in spaced-apart relation on the member 21, which carries the valve needle 19 and has a hollow bore communicating with the interior of each of the diaphragms 20. One end of the member 21 is threaded to a hollow adjusting screw 22 which provides the air passage 23 by which atmospheric air is led into the interior of the diaphragm 20. In order to provide a vacuum type connection a bellows 24 is provided at one end and sealed to the member 21 and at the other end sealed to the wall of the casing 12 through which the adjusting screw moves.

In operation the device of the present invention will be described as it is intended to be adjusted and operated in connection with the vacuum pack parachute. It is desirable that a parachute be packed in a closed container where the pressure will be held between three and four pounds under atmospheric pressure. In such an event the relief valve 3 is adjusted to open on about four and one-half pounds pressure differential between the atmosphere and the interior of the container, of which 2 represents a wall. The needle valve 19 operated by the diaphragm 20 is then adjusted by the adjusting screw 22 to open at a three pound pressure differential. The vacuum tank is then removed and the parachute container evacuated by the vacuum pump, whereupon the vacuum pump is disconnected and the container 18 attached in position. In this container a very high vacuum is initially provided. The pressure will now be maintained within the chamber 14 and within the vacuum pack container of between three and four and one-half pounds below atmospheric pressure. In operation of such a unit on an aircraft as the aircraft ascends the atmospheric pressure descends. When the differential is reduced to three pounds the valve 19 automatically opens and air is drawn into the vacuum container until the pressure within the vacuum pack container is reduced to four pounds. This will occur repeatedly as the airplane ascends to higher altitudes the vacuum always being maintained between three and four pounds below the atmospheric pressure. On the return flight should the parachute not be released from the container as the atmospheric pressure increases so that it exceeds the difference between atmospheric pressure and the pressure within the vacuum pack parachute which is four and one-half pounds, the relief valve will open to reduce the vacuum to four pounds. This operation will be repeated during descent with change of atmospheric pressure.

While the particular example of the invention herein illustrated is well adapted to carry out the objects of the invention, this invention is of the scope set forth in the appended claims.

I claim:

1. A vacuum pack control unit comprising, a combination with a vacuum pack container of a relief valve for admitting air into the container when the differential of pressure between atmospheric and that within the container exceeds a predetermined value, and a vacuum producing means comprising a vacuum tank, a valve member independent of said relief valve for controlling the withdrawal of air from the vacuum pack to said vacuum tank, and a diaphragm for controlling said valve member actuated by a differential in pressure between atmospheric and a pressure within said vacuum pack.

2. A vacuum pack control apparatus which comprises, a combination with a wall of the container for holding a vacuum pack, of a relief valve for providing an inlet for atmospheric air through said wall at a predetermined differential of pressure between the atmosphere and that within the vacuum pack, and air withdrawal means for said vacuum pack, including a vacuum pack tank valve control means independent of said relief valve for said vacuum pack, a diaphragm for actuating said valve control means, said diaphragm being responsive to both atmospheric pressure and the pressure within said vacuum pack.

3. In a vacuum pack control unit, the combination, with a container packed under vacuum, of an air inlet relief valve for introducing air into the vacuum pack when a predetermined differential of pressure between atmospheric and the vacuum pack is exceeded, and a vacuum producing source independent of said relief valve connected with said vacuum tank and valve means in said connection responsive to the drop of pressure differential between atmospheric and the vacuum pack to a predetermined value for removing air from the vacuum pack.

4. A vacuum pack control apparatus which comprises in combination with a wall of a container for holding a parachute under a vacuum pack, a relief valve for providing an inlet for atmospheric air through said wall at a predetermined differential pressure between the atmosphere and that within the vacuum pack, and an independent air withdrawal means for said vacuum pack including a vacuum tank, a needle valve for controlling the entrance of air to said tank, a plurality of expansible enclosed diaphragm members for moving said valve, the exterior of which members are exposed to the pressure within said vacuum pack, and the interior of which is in communication with the atmosphere.

References Cited in the file of this patent

UNITED STATES PATENTS

| | | |
|---|---|---|
| 618,904 | Prince | Feb. 9, 1899 |
| 942,360 | Wilkins | Dec. 7, 1909 |
| 1,564,849 | Hesselman | Dec. 8, 1925 |
| 1,620,322 | Browne | Mar. 8, 1927 |
| 1,627,840 | Donnelly | May 10, 1927 |
| 1,671,275 | Clithero | May 29, 1928 |
| 1,793,019 | Sawyer | Feb. 17, 1931 |
| 1,934,545 | Langdon | Nov. 7, 1933 |
| 2,188,761 | Peterson | Jan. 30, 1940 |
| 2,351,874 | Parker | June 20, 1944 |
| 2,667,856 | Heckendorf | Feb. 2, 1954 |